(12) United States Patent
Heck

(10) Patent No.: US 8,283,399 B2
(45) Date of Patent: Oct. 9, 2012

(54) FILLED TPO COMPOSITIONS WITH GOOD LOW TEMPERATURE DUCTILITY

(75) Inventor: Henry G. Heck, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 323 days.

(21) Appl. No.: 12/676,422

(22) PCT Filed: Aug. 27, 2008

(86) PCT No.: PCT/US2008/074455
§ 371 (c)(1),
(2), (4) Date: Mar. 4, 2010

(87) PCT Pub. No.: WO2009/035850
PCT Pub. Date: Mar. 19, 2009

(65) Prior Publication Data
US 2010/0204381 A1 Aug. 12, 2010

Related U.S. Application Data

(60) Provisional application No. 60/970,581, filed on Sep. 7, 2007.

(51) Int. Cl.
*C08K 3/34* (2006.01)
*C08L 23/12* (2006.01)

(52) U.S. Cl. ........ 524/447; 524/449; 524/451; 524/528; 524/536

(58) Field of Classification Search ............ 524/447, 524/449, 451, 528, 536
See application file for complete search history.

(56) References Cited

U.S. PATENT DOCUMENTS

| | | | |
|---|---|---|---|
| 3,645,992 A | 2/1972 | Elston | |
| 3,821,143 A | 6/1974 | Cluff et al. | |
| 4,076,698 A | 2/1978 | Anderson et al. | |
| 5,206,075 A | 4/1993 | Hodgson, Jr. | |
| 5,241,031 A | 8/1993 | Mehta | |
| 5,272,236 A | 12/1993 | Lai et al. | |
| 5,278,272 A | 1/1994 | Lai et al. | |
| 5,286,776 A | 2/1994 | Ichikawa et al. | |
| 5,902,854 A | 5/1999 | Kelley et al. | |
| 6,300,419 B1 * | 10/2001 | Sehanobish et al. | 525/191 |
| 6,300,451 B1 | 10/2001 | Mehta et al. | |
| 6,372,847 B1 | 4/2002 | Wouters | |
| 6,403,692 B1 * | 6/2002 | Traugott et al. | 524/451 |
| 6,492,465 B1 | 12/2002 | Burkhardt et al. | |
| 6,660,797 B1 | 12/2003 | Banno et al. | |
| 6,667,359 B1 | 12/2003 | Nakagawa et al. | |
| 6,680,361 B1 | 1/2004 | Cady et al. | |
| 6,737,131 B1 | 5/2004 | Garcia | |
| 6,759,475 B2 | 7/2004 | Sakai et al. | |
| 6,964,997 B2 | 11/2005 | Kikuchi et al. | |
| 2004/0094986 A1 | 5/2004 | Landvik et al. | |
| 2004/0122196 A1 | 6/2004 | Pierini et al. | |
| 2004/0188885 A1 | 9/2004 | Lorenzo et al. | |
| 2005/0029692 A1 | 2/2005 | Abe et al. | |
| 2005/0272858 A1 | 12/2005 | Pierini et al. | |
| 2006/0009554 A1 | 1/2006 | Sharma | |
| 2007/0037913 A1 | 2/2007 | Heck | |
| 2007/0037914 A1 | 2/2007 | Heck et al. | |
| 2008/0132595 A1 | 6/2008 | Heck | |

FOREIGN PATENT DOCUMENTS

| | | | |
|---|---|---|---|
| WO | 90/03414 A1 | 4/1990 | |
| WO | 93/03093 A1 | 2/1993 | |
| WO | 02/12377 A2 | 2/2002 | |
| WO | 2005/023924 A1 | 3/2005 | |
| WO | 2006/002436 A2 | 1/2006 | |
| WO | 2007/002435 A1 | 1/2007 | |
| WO | 2007/002436 A1 | 1/2007 | |

* cited by examiner

*Primary Examiner* — Vickey Nerangis
(74) *Attorney, Agent, or Firm* — Whyte Hirschboeck Dudek SC

(57) ABSTRACT

Filled, thermoplastic polyolefin (TPO) compositions having a total energy absorption during impact at −30° C. of at least 20 ft-lb-f as measured by an Instrumented Dart Impact Test (ASTM D3763) at 6.7 m/s and a peak tangent flexural modulus of >2100 MPa (305,000 psi as measured by ASTM D-790, the composition comprising based on the total weight of the TPO composition; A) 36-56 wt % of a crystalline polypropylene having a MFR of at least 1 and a melting point of at least 160° C. as measured by DSC; and B) 64-44 wt % of an elastomer/filler composition comprising (1) an EAO elastomer having a (1) Tg of less than −50° C. as measured by DSC, (b) tan delta between >2 and 3 as measured at 0.1 rad/s and 190° C. with an Advanced Rheometric Expansion Systems rheometer. and (c) HDT greater than or equal to the peak melting temperature of the elastomer as measured by DSC, and (2) a platy filler, e.g., talc, the elastomer and filler present at a weight ratio of elastomer to filler of 3:2 to 2:1; the crystalline polypropylene and elastomer present at a weight ratio of polypropylene to elastomer of less than 2.

20 Claims, No Drawings

FILLED TPO COMPOSITIONS WITH GOOD LOW TEMPERATURE DUCTILITY

CROSS-REFERENCE TO RELATED APPLICATION

This application claims the benefit of U.S. Provisional Application Ser. No. 60/970,581, filed on Sep. 7, 2007; which application is fully incorporated herein by reference.

FIELD OF THE INVENTION

This invention relates to filled thermoplastic polyolefins (TPO) compositions. In one aspect, this invention relates to TPO compositions having both a total energy absorption during impact at −30 degrees Centigrade (° C.) of at least 22 foot-pound force (ft-lb-f, 27.12 Newton-meter (N-m) or Joules (J)) at 6.7 meters per second (m/s) while in another aspect, the invention relates to TPO compositions comprising a crystalline polypropylene having a melt flow rate (MFR) of at least 2, an ethylene/α-olefin (EAO) elastomeric impact modifier having a tan delta between greater than 2 and 3 as measured at 0.1 radians per second (rad/s) at 190° C., and a reinforcing grade of platy filler, for example, talc. In another aspect, this invention relates to molded articles prepared from these TPO compositions.

BACKGROUND OF THE INVENTION

Talc-filled TPOs can be used in injection molding applications, and other applications requiring a balance of rigidity, impact resistance at temperatures down to about −30° C., resistance to scratching and marring, and resistance to deformation at temperatures of about 100° C. The flex modulus for these grades of TPOs is typically between about 100,000 and 200,000 pounds per square inch (psi), and the heat of deflection temperature (HDT) is typically below about 110° C.

There is a continuing interest to replace conventional resins, such as polycarbonate based resins and polystyrene based resins with polyolefin alternatives. Several polypropylene compositions are described in the following patents or applications. U.S. Pat. No. 6,759,475 describes a resin composition based on crystalline polypropylene, which includes: (a) 3-65 weight percent (wt %) of a component soluble in para-xylene at 23° C. (the amorphous phase), (h) 35-97 wt % of a component soluble in para-xylene at 135° C., and insoluble in para-xylene at 23° C. (the high crystalline polypropylene phase), and (c) 0-30 wt % of a component insoluble in para-xylene at 135° C. (the filler). The component (a), soluble in para-xylene at 23° C. is composed substantially of an elastomeric constituent (a1) having a content of styrene, or its derivative, in the range of 0-35 wt %, and an intrinsic viscosity (η) in the range of 0.1-5 decaliters per gram (dl/g). The component (b), soluble is para-xylene at 135° C., and insoluble in para-xylene at 23° C., is composed substantially of a crystalline polypropylene constituent (b1) having an isotactic pentad proportion (mmmm) of 97 percent or higher, a molecular weight distribution (Mw/Mn or MWD) of 6 or higher, and a molecular weight distribution (Mz/Mw) of 6 or higher. The component (c), insoluble in para-xylene at 135° C., is composed substantially of filler (c1).

U.S. Pat. No. 6,964,997 describes a propylene resin composition that has good molding abilities and a good balance of physical properties as well as a good appearance, lower gloss and scratch resistance. These compositions can be used for interior car parts (for example, see abstract). The polypropylene resin composition comprises the following components; a crystalline homopolypropylene having MFR of 500 to 3,000 grams per 10 minutes (g/10 min); a polypropylene consisting of a crystalline homopolypropylene and an ethylene-propylene copolymer rubber having 45 to 80 percent, by mass, of a ethylene content; a polypropylene, consisting of a crystalline homopolypropylene and an ethylene-propylene copolymer rubber having 25 percent, by mass, or more, to below 45 percent, by mass, of a ethylene content; and an ethylene-α-olefin copolymer rubber (for example, see abstract).

U.S. Pat. No. 6,660,797 describes a propylene-based composition for molded polypropylene resin articles, excellent in resistance to scratching and moldability, and well-balanced properties between high rigidity and high impact strength, and also provides a method for molding the above propylene-based composition, to provide high-performance industrial parts and automobile parts, and in particular automobile interior parts (for example, see abstract). An example propylene-based resin composition contains the following components (A) and (B), as described below (for example, see column 2, lines 14-49). Component (A) is a propylene-based resin composed of the following components (a1), (a2) and (a3); 90 to 40 wt %: (a1) propylene/ethylene block copolymer, composed of 60 to 83 wt % of crystalline propylene homopolymer component (a1-1 unit) and 17 to 40 wt % of ethylene/propylene random copolymer component (a1-2 unit), containing 30 to 52 wt % of ethylene, and having a weight-average molecular weight of 230,000 to 600,000; and having a MFR (230° C., 2.16 kilograms (kg)) of 15 to 150 g/10 min, and number of gels of 100, or less, for those having a size of 50 microns (μm), or more, in the molded article of 25 centimeters squared (cm², area) and 0.5 millimeters (m, thickness); 100 weight parts; (a2) talc having an average particle size of 0.5 to 15 μm; 0 to 200 weight parts; (a3) ethylene/α-olefin copolymer rubber, containing 20 to 50 wt % of α-olefin of 3 to 8 carbon atoms and having a MFR (230° C., 2.16 kg) of 0.3 to 100 g/10 min; 0 to 20 weight parts. Component (B) is a propylene-based resin material, composed of the following components (b1) and (b2); 10 to 60 wt %; (b1) propylene homopolymer or propylene/ethylene block copolymer, having a component insoluble in ortho-dichlorobenzene at below 120° C., accounting for 8 wt % or more of the component insoluble at below 100° C., when fractionated with ortho-dichlorobenzene as the solvent, and the component insoluble at below 100° C. has a weight-average molecular weight of 200,000 or more and a MFR (2.30° C., 2.16 kg) of 0.3 to 70 g/10 min; 15 to 80 weight parts; and (b2) talc or wollastonite having an average particle size of 0.5 to 15 μm; 20 to 85 weight parts (for example, see column 2, lines 14-49).

Additional polypropylene compositions are described in U.S. Pat. Nos. 5,286,776 and 6,667,359. Other polyolefin compositions and fabricated articles, such as automotive parts, prepared from the same, are described in U.S. Patent Application Publication Nos: 2005/0029692, 2004/0188885 and 2004/0094986. U.S. Patent Application Publication Nos. 2005/0272858 (see also WO 2004/033509) and 2004/0122196 describe additional propylene-based polymers and compositions. However, the compositions disclosed in these references, and those discussed above, are complex and costly due to the number of polymeric components in each composition and/or do not meet one or more desired rheological, mechanical or thermal properties of the inventive compositions described herein. Moreover, several of the compositions disclosed in these references require a polypropylene/(ethylene/polypropylene) heterophasic rubber, which is not advantageous for low temperature impact properties.

WO 2006/002436 describes compositions comprising (i) a crystalline, isotactic propylene homopolymer, (ii) an ethylene/α-olefin elastomeric impact modifier, and (iii) a reinforcing grade of filler, e.g., talc. The crystalline isotactic propylene homopolymer has a flex modulus greater than 1930 MegaPascal (MPa) and a HDT of greater than 100° C. The ethylene/α-olefin elastomeric impact modifier has a glass transition temperature (Tg) of less than −30° C. and a tan delta measured at 0.1 rad/s at 190° C. of less than 2. The filler has a HUT reinforcing efficiency of at least 2. The composition has an HDT of greater than 100° C., a flex modulus of greater than 1930 MPa, and a total energy absorption during impact at −30° C. of less than 20 ft-lb-f (27.12 N-m or J).

There is a continuing need for low cost polyolefin compositions, simple in polymeric formulations, and which can be used to form manufactured parts, such as injection molded parts, that have excellent mechanical and thermal properties. There is a further need for filled TPO compositions that can be used to form reinforced, light weight articles of manufacture, such as light-weight injection molded parts. There is also a need for such compositions that can be used to form articles of manufacture with improved low temperature performance properties. These needs and others are satisfied by the following invention.

SUMMARY OF THE INVENTION

In one embodiment, the invention is a filled, TPO composition having a total energy absorption during impact at −30° C. of at least 22 ft-lb-f, (29.83 N-m or J) as measured by an Instrumented Dart Impact Test (ASTM D3763 at 6.7 meters/second (m/s)) and a peak tangent flexural modulus of greater than ($\geq$) 2100 MegaPascal (MPa) (305,000 pounds per square inch (psi)) as measured by ASTM D-790, the composition comprising based on the total weight of the TPO composition:

A) 36-56 wt % of a crystalline polypropylene having a MFR of at least 1 and a melting point (Tm) of at least 160° C. as measured by differential scanning calorimetry (DSC); and B) 64-44 wt % of an elastomer/filler composition comprising (1) an EAO elastomer having a (1) Tg of less than −50° C. as measured by DSC, (b) tan delta between greater than 2 and 3 as measured at 0.1 rad/s and 190° C. with an Advanced Rheometric Expansion Systems (ARES) rheometer, and (c) HDT greater than or equal to the peak melting temperature of the elastomer as measured by DSC, and (2) a platy filler, the elastomer and filler present at a weight ratio of elastomer to filler of 3:2 to 2:1; the crystalline polypropylene and elastomer present at a weight ratio of polypropylene to elastomer of less than 2.

In another embodiment, the invention is a filled, TPO composition having a total energy absorption during impact at −30° C. of at least 22 ft-lb-f, (29.83 N-m or J) as measured by an Instrumented Dart Impact Test (ASTM D3763 at 3.2 meters/second (m/s)) and a peak tangent flexural modulus of greater than (>) 2100 MPa (305,000 psi) as measured by ASTM D-790, the composition comprising based on the total weight of the TPO composition:

A) 36-56 wt % of a crystalline polypropylene having a MFR of at least 1 and a melting point (Tin) of at least 160° C. as measured by differential scanning calorimetry (DSC); and B) 64-44 wt % of an elastomer/filler composition comprising (1) an EAO elastomer having a (1) Tg of less than −50° C. as measured by DSC, (b) tan delta between greater than 2 and 3 as measured at 0.1 rails and 190° C. with an Advanced Rheometric Expansion Systems (ARES) rheometer, and (c) HDT greater than or equal to ($\geq$) the peak melting temperature of the elastomer as measured by DSC, and (2) a platy filler, the elastomer and filler present at a weight ratio of elastomer to filler of 3:2 to 2:1.

In still other embodiments, the compositions of this invention are further described as having at least one of (i) low gloss measured as 20 degree gloss using a Minolta gloss meter and ASTM D523, (ii) good low temperature impact resistance to 30° C. as measured by Izod Notched Impact (ASTM D256), and (iii) an HDT (ASTM D634) greater than 100° C., In yet other embodiments, the invention is an article comprising at least one component comprising the inventive composition, e.g., a molded or extruded article, such as a computer part, building or construction material, component part of a home appliance, container, furniture or a furniture component, footwear or footwear component, toy and the like.

Typically, the ARES rheometer is operated at 15 percent strain. The DSC procedure for measuring the glass transition temperature (Tg) includes an initial equilibrium of three minutes at 200° C., followed by a ramp down to −90° C., at 10° C. per minute (10° C./min), followed by equilibrium for five minutes, and finally, followed by ramp up to 200° C. at 10° C./min The TPO compositions of this invention can comprise one or more other components, such as pigment, flame retardant, a scratch and mar resistant additive, and/or one or more other different ethylene/α-olefin interpolymers. The pigment is typically added as a color concentrate, and molded articles made from these compositions exhibit good color, such that they may not need painting.

In another aspect of the invention, the crystalline polypropylene has a flex modulus of greater than 2100 MPa, and an HDT of greater than 110° C., and more preferably a flex modulus of greater than 2210 MPa, and an HDT of greater than 120° C.

In another aspect of the invention, the α-olefin of the ethylene/α-olefin interpolymer is a $C_3$-$C_{20}$ α-olefin and more preferably a $C_4$-$C_{20}$ α-olefin. In a further aspect, the α-olefin of the ethylene/α-olefin interpolymer is selected from propylene, 1-butene, 1-hexene or 1-octene, and more preferably is selected from 1-butene, 1-hexene or 1-octene. In another aspect of the invention, the ethylene/α-olefin interpolymer has a Tg of less than −50° C., preferably less than −52° C., and more preferably less than −54° C. In another aspect, the difference between the DDT and the melting point (Tm) of the ethylene/α-olefin interpolymer is at least 4, preferably at least 6, and more preferably at least 8. In another aspect, the tan delta, measured at 190° C. and 0.1 rad/s, of the ethylene/α-olefin interpolymer is between 2.1 and 3.

In another aspect of the invention, the filler is platy talc. In a further aspect, the composition comprises a sufficient amount of the filler such that the composition has a flexural modulus efficiency factor of 3 or more, and HDT efficiency factor of 1.5 or more. In another aspect, the composition comprises at least 20, preferably at least 25, and typically not in excess of 40, wt % talc based on the total weight of the composition.

The invention also provides for compositions comprising a combination of two or more aspects or embodiments of the invention as described above. The invention also provides for articles comprising a combination of two or more aspects or embodiments as described above.

DETAILED DESCRIPTION OF THE INVENTION

Polypropylene is the primary polymeric component of the formulation, and it ultimately determines the maximum peak tangent flexural modulus and HDT that can be achieved.

Conventional propylene homopolymer has a peak tangent flexural modulus of less than about 1520 MPa (220.4 psi×1000, or kpsi), and an HDT of less than 90° C., and it is neither sufficiently stiff, nor does it retain its stiffness to a high enough temperature, to be useful in these compositions. To achieve the combined targets of low temperature impact resistance and/or improved peak tangent flexural modulus (e.g., greater than 1520 MPa, 1% secant) and/or improved HDT (e.g., greater than 90° C.), preferably the polypropylene is a crystalline polypropylene with a peak tangent flexural modulus greater the 2100 MPa (305 kpsi) and an HDT greater than 100° C. More preferably, the polypropylene is a highly crystalline, isotactic polypropylene with a peak tangent flexural modulus greater than 2210 MPa (320 kpsi) and an HDT greater than 110° C. Even more preferably, the polypropylene is a highly crystalline, isotactic propylene homopolymer with a peak tangent flexural modulus greater than 2210 MPa (320 kpsi) and an HDT greater than 120° C. Occasionally flexural modulus is reported as one percent secant modulus which is approximately equivalent to eighty percent of the peak tangent flexural modulus.

The superior resistance to low temperature impact is contributed by modification of the highly crystalline, isotactic homopolymer polypropylene with an EAO elastomeric impact modifier. To provide the needed impact resistance at −30° C., particularly at speeds of 6.7 m/s, the EAO elastomeric impact modifier has a glass transition temperature (7170 of less than −50° C., more preferably less than −52° C., and most preferably less than −54° C.

In addition, two other characteristics of the elastomeric impact modifier affect the properties of the composition. First, because the EAO elastomeric impact modifier will be above its melting point well before the crystalline polypropylene begins to melt, it is desirable to select a grade with an HDT significantly greater than its melting point. Table 1 below shows the delta obtained by subtracting the DSC peak melting temperature (Tm) from the HDT measured on various EAO elastomers. Preferred grades of EAO elastomeric impact modifiers have a positive delta, more preferred grades have a delta of 4 or more, even more preferred grades have a delta of 6 or more, and the most preferred grades have a delta of 8 or more.

meter, ASTM D523), measured on impact modified benchmarking formulations, utilizing a number of different EAOs, is shown in Table 2 below. The data in this table is based on compounds containing a polymer blend of 70 parts by weight of J707PT (a 35 MFR Mitsui Chemicals impact copolymer polypropylene with 30 parts by weight of various EAOs available from The Dow Chemical Company). The polymer blend is tested without filler and with the addition of 10 percent, by weight, Specialty Minerals ABT-2500 platy talc. This data serves to demonstrate how an EAO with a low tan delta at 190° C. and 0.1 rad/s can dramatically reduce the 20 degree gloss of an otherwise glossy system. This data shows that the choice of elastomer has the greatest effect on lowering the gloss of the polypropylene through the addition of filler (here talc). The polypropylene can vary widely, including both homopolymer and copolymer and both nucleated and non-nucleated polymers. High MFR polypropylene is typically very glossy, and EAO addition has some effect of lowering the gloss to a flat finish.

TABLE 2

Effect of EAO with Low Tan Delta at 190° C. and 0.1 rad/s on the 20 Degree Gloss

| EAO Elastomer | Tan Delta @ 190° C. and 0.1 rad/s | 20 Degree Gloss (70% Polypropylene, 30% EAO) | 20 Degree Gloss (63% Polypropylene, 27% EAO, 10% ABT 2500) |
|---|---|---|---|
| Engage ™ 8150 | 3.28 | 14.5 | 12.4 |
| Engage ™ 7467 | 16.29 | 28.6 | 23.1 |
| ENR 7447 | 106.91 | 72.7 | 45.7 |
| Engage ™ 8200 | 50.16 | 70.6 | 47.5 |
| Engage ™ 8100 | 6.61 | 32.2 | 27.2 |
| Engage ™ 8842 | 4.94 | 37.5 | 31.5 |
| ENR 7380 | 1.58? | 8.8 | 4.1 |

The preferred grades of EAO elastomeric impact modifiers have Tg and delta properties as described above, and also have a tan delta measured at 190° C. and 0.1 rad/s of between greater than 2 and 3, preferably between ≧2.1 and 3.

The low gloss obtained by the use of an EAO elastomeric impact modifier with the tan delta described above makes it

TABLE 1

Tg and Delta (HDT − Tm) Parameters of Select Impact Modifiers

| EAO Elastomer | Target MI, dg/min | Density, g/cc | Tg, ° C. | Tm, ° C. | Viscosity Poise @ 190° C. and 0.1 rad/s | Tan Delta @ 190° C. and 0.1 rad/s | HDT, ° C. | Delta, (HDT − Tm) |
|---|---|---|---|---|---|---|---|---|
| Engage 8150 | 0.5 | 0.868 | −52 | 54.99 | 234600 | 3.28 | Fail | |
| ENR 7467 | 1.2 | 0.862 | −56 | 35.39 | 59059 | 16.29 | Fail | |
| ENR 7447 | 5.0 | 0.865 | −53 | 34.74 | 17166 | 106.91 | 49.00 | 14.26 |
| Engage 8200 | 5.0 | 0.87 | −53 | 59.05 | 18312 | 50.16 | Fail | |
| Engage 8100 | 1.0 | 0.87 | −52 | 59.84 | 107900 | 6.61 | 66.20 | 6.36 |
| Engage 8842 | 1.0 | 0.857 | −58 | 38.41 | 111620 | 4.94 | 48.70 | 10.29 |
| ENR 7380 | 0.3 | 0.87 | −52 | 50.30 | 582470 | 1.58 | 60.55 | 10.25 |

ENGAGE™ elastomers are ethylene-octene copolymers, and ENR elastomers are ethylene-butene copolymers. The Dow Chemical Company manufactures both EAO elastomers.

Second, the tan delta of the elastomer, measured at 0.1 rad/s at 190° C., correlates with the gloss of the finished injection molded part. The lower the tan delta, the lower is the gloss. The tan delta and the viscosity in Poise, measured at these conditions, are reported in Table 1 above. The correlation between the tan delta and the 20 degree gloss (Minolta gloss possible to provide a part that is colored during the molding process through the use of a color concentrate. This mold-in-color process saves a painting step when the compound has an acceptably low gloss. Because paint is widely known to improve the resistance of the part to damage from scratching and marring, the color concentrate is frequently additionally modified with materials that decrease the surface friction and reduce the surface damage done by scratching and marring. Common additives known in the art are silicon based materials, such as high molecular weight polydimethyl siloxanes, waxy materials that bloom to the surface, such as erucamide, and some specialty materials that contain a combination of a hard tough plastic, such as nylon, with surface active agents, Polypropylene The polypropylene used in the practice of this invention can vary widely, and it includes both homopolymer and copolymer and both nucleated and non-nucleated polymers and any combinations of these. As here used, "nucleated" refers to a polymer that has been modified by addition of a nucleating agent such as MILLAD®, a dibenzyl sorbitol commercially available from Milliken. Other conventional nucleating agents can also be used. Platy filler, such a talc, may act as a nucleator, and it may make the addition of another nucleating agent unnecessary. Preferably, the polypropylene is a homopolymer, The polypropylene is crystalline, typically highly crystalline, i.e., it is essentially totally (near or at 100%) soluble in para-xylene at 135° C. In contrast, at 23° C. it is >98%, typically >99%, insoluble in para-xylene. The test for measuring the solubility of the polypropylene at these temperatures is described in U.S. Pat. No. 6,759,475.

The MFR (230° C./2.16 kg weight) of the polypropylene is typically between 1 and 50, and it will vary with the intended end-use of the composition. For thermoform applications, the MFR is typically between 1 and 2. For injection molding applications, the MFR is typically 30 or greater. The polypropylene also desirably has a melting point Tm greater than 160° C. as measured by DSC.

Polymerization processes, used to produce high melting polymers, include the slurry process, which is run at about 50-90° C. and 0.5-1.5 MPa (5-15 atm), and both the gas-phase and liquid-monomer processes in which extra care must be given to the removal of amorphous polymer. The polypropylene may also be prepared by using any of a variety of single site, metallocene and constrained geometry catalysts together with their associated processes. Polymerizations may take place in a stirred tank reactor, a gas phase reactor, a single continuously stirred tank reactor and a single slurry loop reactor, and other suitable reactors.

In a preferred embodiment, polypropylene homopolymer is prepared in a single, continuous bulk phase (condensed propylene) stirred reactor, using a Ziegler-Natta catalyst, which includes a titanium catalytic active metal species, supported on a magnesium chloride support, and suspended in a mineral oil. The suspended catalyst may be pumped directly into the reactor. Hydrogen may be used as a chain transfer agent to control molecular weight. Polymerizations may take place in a stirred tank reactor, a gas phase fluidized bed reactor, a single continuously stirred tank reactor and a single slurry loop reactor. Such polymerizations, and the resulting polypropylene homopolymers, are described in U.S. Patent Application Publication No. 2005/0272858 (see also WO 2004/033509), and U.S. Patent Application Publication No. 2004/0122196.

In one embodiment, the polypropylene has a polydispersity or molecular weight distribution (MWD or Mw/Mn) from 2 to 6, more preferably from 2 to 5 and most preferably from 3 to 5. In another embodiment, the MWD is less than or equal to 6, and more preferably $\leq 5.5$, and even more preferably 5.

In another embodiment, the polypropylene has a density from 0.88 to 0.92, preferably from 0.89 to 0.91, grams per cubic centimeter (g/cc).

In another embodiment, the polypropylene has a number average molecular weight (Mn) from 10,000 to 200,000, preferably from 15,000 to 150,000 and even more preferably from 30,000 to 100,000, grams per mole (g/mol).

In another embodiment, the polypropylene has a weight average molecular weight (Mw) from 80,000 to 400,000, preferably from 100,000 to 300,000 and even more preferably from 120,000 to 200,000, g/mol.

As is further described later in this disclosure, impact polypropylenes are disfavored for use in this invention. As described in U.S. Pat. No. 6,492,465, typical propylene impact copolymers contain two phases or components, i.e., a homopolymer component and a copolymer component. These two components are usually produced in a sequential polymerization process in which the homopolymer is produced in a first reactor and then is transferred to a second reactor in which the copolymer is produced and incorporated into the matrix of the homopolymer. The copolymer has rubbery characteristics, and it provides desirable impact resistance. The homopolymer provides the overall stiffness. However, the presence of the copolymer tends to dilute the effect of the ethylene/α-olefin interpolymer on the flexural modulus of the compositions of this invention.

Ethylene/α-Olefin Interpolymer

The compositions of the invention comprise at least one ethylene/α-olefin interpolymer, which optionally may contain a diene, "Interpolymer" means a polymer polymerized from at least two different monomers. It includes, for example, copolymers, terpolymers and tetrapolymers. It particularly includes a polymer prepared by polymerizing ethylene with at least one comonomer, typically an alpha-olefin (α-olefin) of 3 to 20 carbon atoms ($C_3$-$C_{20}$), preferably 4 to 20 carbon atoms ($C_4$-$C_{20}$), more preferably 4 to 12 carbon atoms ($C_4$-$C_{12}$) and even more preferably 4 to 8 carbon atoms ($C_4$-$C_8$). The α-olefins include, but are not limited to, 1-butene, 1-pentene, 1-hexene, 4-methyl-1-pentene, 1-heptene, and 1-octene. Preferred α-olefins include 1-butene, 1-pentene, 1-hexene, 4-methyl-1-pentene, 1-heptene, and 1-octene. The α-olefin is desirably a $C_4$-$C_8$ α-olefin.

Interpolymers include ethylene/butene (EB) copolymers, ethylene/hexene (EH), ethylene/octene (EO) copolymers, ethylene/alpha-olefin/diene modified (EAODM) interpolymers such as ethylene/propylene/diene modified (EPDM) interpolymers and ethylene/propylene/octene terpolymers. Preferred copolymers include EB, EH and EO copolymers.

Suitable diene monomers include conjugated and nonconjugated dienes. The nonconjugated diolefin can be a $C_5$-$C_{15}$ straight chain, branched chain or cyclic hydrocarbon diene. Illustrative nonconjugated dienes are straight chain acyclic dienes, such as 1,4-hexadiene and 1,5-heptadiene; branched chain acyclic dienes, such as 5-methyl-1,4-hexadiene, 2-methyl-1,5-hexadiene, 6-methyl-1,5-heptadiene, 7-methyl-1,6-octadiene, 3,7-dimethyl-1,6-octadiene, 3,7-dimethyl-1,7-octadiene, 5,7-dimethyl-1,7-octadiene, 1,9-decadiene and mixed isomers of dihydromyrcene; single ring alicyclic dienes, such as 1,4-cyclohexadiene, 1,5-cyclooctadiene and 1,5-cyclododecadiene; multi-ring alicyclic fused and bridged ring dienes, such as tetrahydroindene, methyl tetrahydroindene; alkenyl, alkylidene, cycloalkenyl and cycloalkylidene norbornenes, such as 5-methylene-2-norbornene (MNB), 5-ethylidene 2 norbornene (ENB), 5-vinyl-2-norbornene, 5-propenyl-2-norbornene, 5-isopropyldene2norbornene, 5-(4-cyclopentenyl)-2-norbornene and 5-cyclohexylidene-2-norbornene. Preferred nonconjugated dienes include ENB, 1,4-hexadiene, 7-methyl-1,6-octadiene, and more preferably the diene is ENB. Suitable conjugated dienes include 1,3- pentadiene, 1,3-butadiene, 2-methyl-1,3-butadiene, 4-methyl-1,3-pentadiene, 1,3-cyclopentadiene.

Although preferred interpolymers are substantially free of any diene monomer that typically induces LCB, one may include such a monomer, if costs are acceptable, and desirable interpolymer properties, such as processability, tensile strength and elongation, do not degrade to an unacceptable level. Such diene monomers include, but are not limited to, dicyclopentadiene, NBD, methyl norbornadiene, vinyl-norbornene, 1,6-octadiene, 1,7-octadiene, and 1,9-decadiene. When added, such monomers may be added in an amount within a range from greater than zero to 3, more preferably from greater than zero to 2, wt % based on interpolymer weight.

The ethylene/α-olefin interpolymers of the invention may be branched and/or unbranched interpolymers. The presence or absence of branching in the ethylene/α-olefin interpolymers, and if branching is present, the amount of branching, can vary widely, and may depend on the desired processing conditions and the desired polymer properties.

The nature of the ethylene/α-olefin branching is not critical to the practice of this invention, and as such, it can vary to convenience. Preferably, the branching is long chain branching (LCB). The ability to incorporate LCB into polymer backbones has been known and practiced for many years. In U.S. Pat. No. 3,821,143 a 1,4-hexadiene was used as a branching monomer to prepare ethylene/propylene/diene (EPDM) polymers having LCB. Such branching agents are sometimes referred to as H-branching agents. U.S. Pat. Nos. 6,300,451 and 6,372,847 also use various H-type branching agents to prepare polymers having LCB. In U.S. Pat. No. 5,278,272 constrained geometry catalysts (CGC) are taught to have the ability to incorporate vinyl terminated macromonomers into the polymer backbone to form LCB polymers. Such branching is referred to as T-type branching.

U.S. Pat. No. 5,278,272 teaches such CGC are unique in their ability to incorporate large unsaturated molecules into a polymer backbone. The amount of LCB that can be incorporated by these CGC is typically from 0.01 LCB/1000 carbon atoms to 3 LCB/1000 carbon atoms (both backbone and branched carbon atoms).

Preferably, the type of LCB in the interpolymers used in the practice of this invention is T-type branching, as opposed to H-type branching. T-type branching is typically obtained by copolymerization of ethylene or other alpha olefins with chain end unsaturated macromonomers in the presence of a constrained geometry catalyst under the appropriate reactor conditions, such as those described in U.S. Pat. No. 6,680,361. If extremely high levels of LCB are desired, H-type branching is the preferred method, since T-type branching has a practical upper limit to the degree of LCB. As discussed in U.S. Pat. No. 6,680,361, as the level of T-type branching increases, the efficiency or throughput of the manufacturing process decreases significantly, until the point is reached where production becomes economically unviable. The T-type LCB polymers can be produced with constrained geometry catalysts, without measurable gels, but with very high levels of T-type LCB. Because the macromonomer being incorporated into the growing polymer chain has only one reactive unsaturation site, the resulting polymer only contains side chains of varying lengths, and at different intervals along the polymer backbone.

H-type branching is typically obtained by copolymerization of ethylene or other alpha-olefins with a diene having two double bonds reactive with a nonmetallocene type of catalyst in the polymerization process. As the name implies, the diene attaches one polymer molecule to another polymer molecule through a diene bridge; the resulting polymer molecule resembling an H that might be described as more of a crosslink than a long chain branch. H-type branching is typically used when extremely high levels of branching are desired. If too much diene is used, the polymer molecule can form so much branching or crosslinking that the polymer molecule is no longer soluble in the reaction solvent (in a solution process), and consequently falls out of solution, resulting in the formation of gel particles in the polymer. Additionally, use of H-type branching agents may deactivate metallocene catalysts, and reduce catalyst efficiency. Thus, when H-type branching agents are used, the catalysts used are typically not metallocene catalysts. The catalysts used to prepare the H-type branched polymers in U.S. Pat. No. 6,372,847 are vanadium type catalysts.

Suitable ethylene interpolymers include ENGAGE™, AFFINITY™, and NORDEL™ polymers available from The Dow Chemical Company, and VISTALON™ and EXACT™ polymers available from ExxonMobil Chemical Company, and TAFMER™ polymers available from Mitsui Chemical.

In another embodiment, the ethylene/α-olefin interpolymer has a Mw/Mn from 1 to 5, more preferably from 1.5 to 4 and even more preferably from 2 to 3.

In another embodiment, the ethylene/α-olefin interpolymer has a density from 0.80 to 0.90, preferably from 0.82 to 0.88 and more preferably from 0.83 to 0.87, g/cc. In another embodiment, the ethylene/α-olefin interpolymer has a density $\leq 0.875$, preferably $\leq 0.87$ and even more preferably $\leq 0.86$, g/cc.

In another embodiment, the ethylene/α-olefin interpolymer has a melt index (MI or $I_2$, 190° C./2.16 kg) from 0.05 to 10, preferably from 0.1 to 5, more preferably from 0.2 to 2 and even more preferably from 0.5 to 1, g/10 min. In another embodiment, the elastomer component has an $I_2$ of 1 or less, preferably of 0.5 or less and more preferably of 0.3 or less, g/10 min.

In another embodiment, the ethylene/α-olefin interpolymer has a Mn from 40,000 to 200,000, preferably from 50,000 to 150,000 and more preferably from 60,000 to 100,000, g/mol.

In another embodiment, the ethylene/α-olefin interpolymer has a Mw from 80,000 to 400,000, preferably from 100,000 to 300,000 and more preferably from 120,000 to 200,000, g/mol.

In another embodiment, the ethylene/α-olefin interpolymer has a Tg of less than 50° C., preferably less than −52° C., and more preferably less than −54° C.

In another embodiment, the ethylene/α-olefin interpolymer is a homogeneously branched linear or homogeneously branched substantially linear ethylene/α-olefin interpolymer. Processes for preparing homogeneous polymers are disclosed in U.S. Pat. Nos. 5,206,075 and 5,241,031, and WO 93/03093. Further details regarding the production of homogeneous ethylene α-olefin copolymers are disclosed in U.S. Pat. Nos. 5,206,075 and 5,241,031, WO 93/03093 and 90/03414.

The terms "homogeneous" and "homogeneously-branched" are used in reference to an ethylene/α-olefin polymer (or interpolymer), in which the comonomer(s) is randomly distributed within a given polymer molecule, and substantially all of the polymer molecules have the same ethylene-to-comonomer(s) ratio. The homogeneously branched ethylene interpolymers include linear ethylene interpolymers, and substantially linear ethylene interpolymers.

Included amongst the homogeneously branched linear ethylene interpolymers are ethylene interpolymers, which lack long chain branching, but do have short chain branches, derived from the comonomer polymerized into the interpolymer, and which are homogeneously distributed, both within the same polymer chain, and between different polymer chains. That is, homogeneously branched linear ethylene interpolymers lack long chain branching, just as is the case for the linear low density polyethylene polymers or linear high density polyethylene polymers, made using uniform branching distribution polymerization processes, as described, for example, in U.S. Pat. No. 3,645,992. Commercial examples of homogeneously branched linear ethylene/α-olefin interpolymers include TAFMER™ polymers supplied by the Mitsui Chemical Company and EXACT™ polymers supplied by ExxonMobil Chemical Company.

Substantially linear ethylene interpolymers used in the present invention are described in U.S. Pat. Nos. 5,272,236 and 5,278,272. As discussed above, the substantially linear ethylene interpolymers are those in which the comonomer is randomly distributed within a given interpolymer molecule, and in which substantially all of the interpolymer molecules have the same ethylene/comonomer ratio within that interpolymer. Substantially linear ethylene interpolymers are prepared using a constrained geometry catalyst. Examples of constrained geometry catalysts, and such preparations, are also described in U.S. Pat. Nos. 5,272,236 and 5,278,272.

In addition, the substantially linear ethylene interpolymers are homogeneously branched ethylene polymers having long chain branching. The long chain branches have about the same comonomer distribution as the polymer backbone, and can have about the same length as the length of the polymer backbone. As discussed above, "substantially linear," typically, is in reference to a polymer that is substituted, on average, with 0.01 long chain branches per 1000 total carbons (including both backbone and branch carbons) to 3 long chain branches per 1000 total carbons. Commercial examples of substantially linear polymers include the ENGAGE™ and AFFENITY™ polymers.

The substantially linear ethylene interpolymers form a unique class of homogeneously branched ethylene polymers. They differ substantially from the well-known class of conventional, homogeneously branched linear ethylene interpolymers described in U.S. Pat. No. 3,645,992, and, moreover, they are not in the same class as conventional heterogeneous Ziegler-Natta catalyst polymerized linear ethylene polymers (for example, ultra low density polyethylene (ULDPE), linear low density polyethylene (LLDPE) or high density polyethylene (HDPE), made, for example, using the technique disclosed in U.S. Pat. No. 4,076,698; nor are they in the same class as high pressure, free-radical initiated, highly branched polyethylenes, such as, for example, low density polyethylene (LDPE), ethylene-acrylic acid (EAA) copolymers and ethylene vinyl acetate (EVA) copolymers.

Platy Filler

Any inert material with a generally disc-like shape can be used as the platy filler in the TPO compositions of this invention. Typically and preferably, the platy filler is an inert mineral powder, e.g., talc, kaolin clay or mica, and more preferably it is platy talc. Common platy talcs and kaolin clays are identified in Tables 3 and 4, respectively. The particular grade of platy talc is selected to have sufficient reinforcing strength, so as to impart or maintain the desired flex modulus and MT of the final composition, without exceeding the density of the polymeric resin that the composition is intended to replace. Typically, the density of commercial grade resins is about 1.13 grams per milliliter (g/ml). For compositions made with the high crystallinity, propylene homopolymers and EAO elastomers of this invention, a filler loading of about 30 wt % is typical, although more or less can be used as desired.

TABLE 3

Common Platy Talc

| Product Name | Supplier | Hegman Grind | Surface Area (B.E.T. $m^2/g$*) | Median Diameter (μm) | Brightness |
|---|---|---|---|---|---|
| ABT 2500 | Specialty Minerals, Inc. | 5.5 | 5.5 | 2.3 average | N.A |
| HAR V3410 | Luzenac | N.A. | 16 | 2.0 | N.A. |
| Nicron 674 | Luzenac | 6.5 | 14 | 1.9 | N.A. |
| Cimpact 710 | Luzenac | 7 | N.A. | 1.7 | 91 |
| JetFil 700 | Luzenac | 6.5 | N.A. | 1.5 | 88 |
| JetFil 625 | Luzenac | 6 | N.A. | 2.2 | 88 |

*Square meters per gram

TABLE 4

Common Platy Kaolin Clays

| Product Name | Supplier | Hegman Grind | Surface Area (B.E.T. $m^2/g$*) | Median Diameter (μm) | Brightness |
|---|---|---|---|---|---|
| Polyfil DL | J. M. Huber | 5.5 | 5.5 | 1.3 | 91 |
| Polyfil DLX | J. M. Huber | N.A. | N.A. | N.A. | N.A. |
| Kaopaque 10 | Imerys | N.A. | N.A. | N.A. | N.A. |

*Square meters per gram

During the processing of the inventive compositions under a flow stress, the plate shaped filler will generally align parallel to the direction of the composition flow. This flow pattern helps to reduce the shrinkage of the composition in the flow direction, and makes it possible for the filler to reinforce the resulting polymeric product, increasing both the heat deflection temperature and the flexural modulus. The effectiveness of particular filler can be determined by fitting a line to data taken at various levels of filler addition. The slope of the line, in units of "percent increase in property" divided by "weight percent filler addition" is a measure of the efficiency of a particular filler in increasing either heat of deflection temperature or flexural modulus.

The reinforcing efficiency of the filler on the composition is evaluated by measuring the effect of a 20 weight percent addition of the filler on the flex modulus and MT of the blend of polypropylene and EAO. A flex modulus efficiency factor, with units of percent increase in modulus to percent loading of filler, can then be calculated. This factor is relatively linear in a filler loading range from about 10 to 40 weight percent. A related heat deflection efficiency factor can similarly be calculated for each filler grade by compounding the crystalline polypropylene and EAO elastomeric impact modifier with the reinforcing filler at 20 weight percent and without the filler. The heat deflection efficiency factor is less linear than the flex modulus efficiency factor, and more sensitive to the specific grade of polypropylene and EAO. As a result, fillers of interest are typically benchmarked at a 20 weight percent loading with the crystalline polypropylene and EAO elastomeric impact modifier of this invention. Preferred reinforcing filler grades, for example, platy talc, of this invention have a heat deflection efficiency factor of greater than, or equal to, 1.5, more preferably greater than 1.7, and most preferably greater than 1.9, when formulated at 20 weight percent loadings in the crystalline propylene polypropylene and EAO elastomeric impact modifier. Simultaneously, the preferred reinforcing filler grades of this invention have a flexural modulus efficiency factor greater than 3, preferably greater than 3.5 and more preferably greater than 4.

In one embodiment, the medium particle size is from 0.1 micron to 50 microns, preferably from 0.5 micron to 25 microns, and more preferably from 1 micron to 10 microns.

Preparation of Compositions

The TPO compositions of this invention contain at least one crystalline polypropylene, at least one ethylene/α-olefin interpolymer, and at least one platy filler. While such compositions can be prepared by any one of a number of different processes, generally these processes fall into one of three categories, i.e., post-reactor blending, in-reactor blending, or a combination of the two. Illustrative of post-reactor blending are melt extruders into which two or more solid polymers are fed and physically mixed into a substantially homogeneous composition, and multiple solution, slurry or gas-phase reactors, arranged in a parallel array, and in which, the output from each is blended with one another to form a substantially homogeneous composition, which is ultimately recovered in solid form. Illustrative of in-reactor blending are multiple reactors connected in series, and single reactors charged with two or more catalysts. However, in-reactor blending is not favored because the elastomer can become at least partially soluble within the polypropylene matrix, and this can lead to a lowering of the flexural modulus and/or HDT. As a consequence, preferably the compositions are prepared by post-reactor blending.

Typically the propylene homopolymer and ethylene/α-olefin interpolymer are blended with one another, before the addition of the filler, although the filler may first be blended with one or the other of the polymers prior to the addition of the other polymer. The filler can be added neat or as a masterbatch, based on either polymer. All components of the composition are blended with one another, until a substantially homogeneous composition is obtained. Standard mixers and extruders can be used for the blending. The compositions of this invention can contain other components as well; for example, pigments, flame retardants, anti-oxidants, processing aids and the like, The TPO compositions of this invention are used in the same manner as conventional polycarbonate based and polystyrene based compositions. In particular, the compositions of this invention are well suited or the manufacture of structures used in the preparation of soft touch instrument panels and like articles of manufacture.

Composition

The inventive composition typically contains from 36 to 56, preferably from 39 to 53 and more preferably from 42 to 50, wt % of the crystalline polypropylene based on the sum weight of the polypropylene, ethylene/α-olefin elastomer and platy filler. The inventive composition typically contains from 64 to 44, preferably from 61 to 47 and more preferably from 58 to 50, wt % of an elastomer/filler composition (i.e., a composition of EAO elastomer and platy filler) based on the sum weight of the polypropylene, ethylene/α-olefin elastomer and platy filler. The weight ratio of elastomer to platy filler in the composition is typically between 3:2 and 2:1. Typically, the elastomer and filler content are near the same, i.e., 1:1.

In one embodiment, the composition contains from 20 to 40, preferably from 25 to 40, wt % platy filler based on the total weight of the composition.

In another embodiment, the composition has a total energy absorption during impact of at least 22 (29.83), preferably at least 25 (33.9) and more preferably at least 30 (40.68), ft-lb-f (N-m or J) as measured at −30° C. by Instrumented. Dart Impact Test ASTM D3763 at 6.7 m/s.

In another embodiment, the composition has a peak tangent flexural modulus ≧2100, preferably ≧2200 and more preferably ≧2300, MPa as measured by ASTM D790.

In another embodiment, the composition has both a total energy absorption during impact of at least 22 (29.83), preferably at least 25 (319) and more preferably at least 30 (40.68), ft-lb-f (N-m or J) as measured at −30° C. by Instrumented Dart Impact Test ASTM D3763 at 6.7 m/s, and a peak tangent flexural modulus ≧2100, preferably ≧2.200 and more preferably ≧2300, MPa as measured by ASTM D790.

In another embodiment, the composition has a crystallization temperature, Tc, ≧110° C. preferably ≧120° C., more preferably ≧130° C. and even more preferably ≧140° C.

In another embodiment, the composition has a HDT, as measured by ASTM D648, ≧110° C., preferably ≧120° C., more preferably ≧130° C. and even more preferably ≧140° C.

In another embodiment, the composition has a 20° gloss ≦15 preferably ≦10 and more preferably ≦18. The gloss measurement is affected by the amount of talc or other filler in the composition. Generally, the more filler in the composition, the lower the gloss of the composition.

In another embodiment, the composition does not contain another propylene-based polymer, other than the crystalline polypropylene component.

In another embodiment, the composition contains ≧50, preferably ≧60 and more preferably ≧70, wt % of the crystalline polypropylene based on the total weight of the composition.

In another embodiment, the composition contains ≦40, preferably ≦35 and more preferably ≦30, wt % of the ethylene/α-olefin elastomer based on the total weight of the composition.

The compositions of this invention can contain various additives as long as these additives are not detrimental to the desired properties of the composition, e.g., total energy absorption, flexural modulus, etc. For example, solid additives that do not dissolve in the polymers of the composition are disfavored because they have a generally negative impact on the re-enforcing capability of the filler, e.g., of the platy talc. The additives that are used in the practice of this invention are used in their conventional manner and in minimum amounts.

In one embodiment, the composition contains a non-halogen intumescent, as described in U.S. Pat. No. 6,737,131. An intumescent is an additive to a plastic that forms a char when the plastic is subjected to flame or high heat. The intumescent reacts to produce an insulation barrier of carbon that eliminates or reduces combustion. Preferred non-halogen intumescent additives include Exolit® MR, a product of Hoechst Chemical Company (a phosphate compound); Char guard 32911 or NH-1511 products of Great Lakes Chemical Company (phosphate compounds); Spin Flam, a product of Monsanto Chemical Company (a phosphate compound); Amgard EDAP, a product of Albright & Wilson (an ethylene diamine phosphate); Budit 311, a product of Budauheim (a melamine pyrophosphate); NCENDX™ P-30, a product of Albemarle Corporation; and FRX44, a product of Unitex Corp (an ethylene diamine phosphate).

In another embodiment, the composition contains a metal hydrate flame retardant such as aluminum trihydroxide, magnesium dihydroxide, or a combination of the two. In a further embodiment, the flame retardant is a metal hydrate, and it is present in an amount between 25 and 75 wt %, based on the total weight of the composition. In another embodiment, the surface of the metal hydroxide may be coated with one or more materials, including silanes, titanates, zirconates, carboxylic acids and maleic anhydride-grafted polymers. In another embodiment, the average particle size of the metal hydrate may range from less than 0.1 to 50 µm. In some cases, a metal hydroxide is used with a nano-scale particle size. The metal hydroxide may be naturally occurring or synthetic. The flame-retardant composition may contain other flame-retardant additives. Other suitable non-halogenated flame retardant additives include calcium carbonate, red phosphorus, silica, alumina, titanium oxides, talc, clay, organo-modified clay, zinc borate, antimony trioxide, wollastonite, mica, magadiite, organo-modified magadiite, silicone polymers, phosphate esters, hindered amine stabilizers, ammonium octamolybdate, intumescent compounds, and expandable graphite. Suitable halogenated flame retardant additives include decabromodiphenyl oxide, decabromodiphenyl ethane, and ethylene-bis(tetrabromophthalimide). A further description of such flame retardants is found in WO 2005/023924.

In another embodiment, the inventive compositions contain a compatibilizing amount of a flame retardant package, which includes a halogenated alkane flame retardant, an aromatic halogenated flame retardant, and optionally a flame retardant synergist. In a further embodiment, the alkane flame retardant is selected from hexahalocyclododecane; tetrabromocyclooctane; pentabromochlorocyclohexane; 1,2-dibromo-4-(1,2-dibromoethyl)cyclohexane; 1,1,1,3-tetrabromomononane; or a combination of two or more such compounds. In another embodiment, the aromatic halogenated flame retardant comprises one or more of hexahalodiphenyl ethers; octahalodipheny ethers; decahalodiphenyl ethers; decahalobiphenyl. ethanes; 1,2-bis(trihalophenoxy) ethanes; 1,2-bis(pentahalophenoxy) ethanes; tetrahalobisphenol-A; ethylene (N,N')-bis-tetrahalophtlialimides; tetrabromobisphenol-A; bis(2,3-dibromopropypether; tetrahalophthalic anhydrides; hexahalobenzenes; halogenated indanes; halogenated phosphate esters; halogenated polystyrenes; polymers of halogenated bisphenol-A and epichlorohydrin; or a combination of two or more such compounds. In yet another embodiment, the flame retardant synergist comprises one or more of a metal oxide, halogenated paraffin, triphenylphosphate, dimethyldiphenylbutane, and polycumyl.

In another embodiment, the composition contains from about 0.5 to about 8 parts by weight halogenated alkane flame retardant; from about 0.5 to about 8 parts by weight aromatic halogenated flame retardant; from 0 to about 6 parts by weight flame retardant synergist, all based on the total weight of the composition. A further description of such flame retardants is found in WO 2002/12377.

The composition advantageously may further comprise at least one additive of the type conventionally added to polymers or polymer compositions. These additives include, for example, process oils; antioxidants; surface tension modifiers; UV stabilizers; scratch/mar additives, such as polydimethyl siloxane (PDMS) or functionalized polydimethyl siloxane or IRGASURF® SR 100 (available from Ciba Specialty Chemicals) or scratch/mar formulations containing erucamide; anti-block agents; dispersants; blowing agents; linear or substantially linear EAOs; MIT; lubricants; crosslinking agents such as peroxides; antimicrobial agents such as organometallics, isothiazolones, organosulfurs and mercaptans; antioxidants such as phenolics, secondary amines, phosphites and thioesters; antistatic agents such as quaternary ammonium compounds, amines, and ethoxylated, propoxylated or glycerol compounds. Functionalized polydimethyl siloxanes include, but are not limited to hydroxyl functionalized polydimethyl siloxane, amine functionalized polydimethyl siloxane, vinyl functionalized polydimethyl siloxane, aryl functionalized polydimethyl siloxane, alkyl. functionalized polydimethyl siloxane, carboxyl functionalized polydimethyl siloxane, mercaptan functionalized polydimethyl siloxane, and derivatives of the same. Such additives, if used, are used in conventional amounts and manners.

The inventive compositions may also contain additional additives such as, but not limited to, hydrolytic stabilizers; lubricants such as fatty acids, fatty alcohols, esters, fatty amides, metallic stearates, paraffinic and microcrystalline waxes, silicones and orthophosphoric acid esters; mold release agents, such as fine-particle or powdered solids, soaps, waxes, silicones, polyglycols and complex esters such as trimethylolpropane tristearate or pentaerythritol tetrastearate; pigments, dyes and colorants; plasticizers such as esters of dibasic acids (or their anhydrides) with monohydric alcohols such as o-phthalates, adipates and benzoates; heat stabilizers such as organotin mercaptides, an octyl ester of thioglycolic acid and a barium or cadmium carboxylate; ultraviolet light stabilizers used as a hindered amine, an o-hydroxyphenylbenzothiazole, a 2-hydroxy, 4-alkoxyenzophenone, a salicylate, a cyanoacrylate, a nickel chelate and a benzylidene malonate and oxalanilide; and zeolites, molecular sieves, anti stat agents and other known deodorizers.

A preferred hindered phenolic antioxidant is Irganox® 1076 antioxidant, available from Ciba Specialty Chemicals. Skilled artisans can readily select any suitable combination of additives and additive amounts, as well as the method of incorporating the additive(s) into the composition, without undue experimentation. Typically, each of the above additives, if used, does not exceed 45 weight percent, based on total composition weight, and are used advantageously from 0.001 to 20, preferably from 0.01 to 15 and more preferably from 0.1 to 10, wt %.

In one embodiment of the invention, an inventive composition includes at least one polydimethylsiloxane (PDMS) to improve the scratch mar resistance of the resulting product. The polydimethylsiloxane is typically present from 0.1 to 10 wt % based on the weight of the polymer composition. Suitable polydimethylsiloxanes include those having a viscosity at 25° C. of greater than 100,000 centistokes, and more preferably from $1 \times 10^6$ to $2.5 \times 10^6$ centistokes. In a further embodiment, the composition also includes an ethylene homopolymer or ethylene interpolymer grafted with maleic anhydride or succinic anhydride groups, and preferably the grafted ethylene homopolymer or interpolymer comprises less than 20 percent of the composition. In yet a further embodiment, the composition also includes at least one additive, such as a plasticizer, a pigment or colorant, a UV stabilizer, or filler. Fillers may include calcined or uncalcined fillers. Suitable components for scratch/mar resistant formulations are described in more detail in U.S. Pat. No. 5,902,854.

Additional scratch/mar formulations useful in the compositions of the invention contain IRGASURF® SR 100 with one or more additives as previously described. A particularly suitable formulation contains an aliphatic amide in a polyethylene carrier, such as IRGASURF® SR 100 with one or more fillers, such as wollastonite, and an ethylene homopolymer or interpolymer grafted with maleic anhydride or succinic anhydride groups. Other scratch resistant polyolefin formulations are described in U.S. Patent Application Publication No. 2006/009554.

In a particularly preferred embodiment, the compositions contain a scratch/mar concentrate, which, in turn, contains from 10 to 30 wt % of at least one colorant and/or UV stabilizer, from 5 to 15 wt % of at least one polydimethylsiloxane, from 30 to 50 wt % of at least one filler, and from 10 to 35 wt % of at least one ethylene homopolymer or interpolymer grafted with maleic anhydride or succinic anhydride groups. The weight percentages based on the total weight of the scratch/mar concentrate.

Articles of the Invention

Articles can be prepared by injection molding, extrusion, extrusion followed by either male or female thermoforming, low pressure molding, compression molding or the like.

A partial, far from exhaustive, listing of articles that can be fabricated from the compositions of the invention includes building and construction ducting, instrument panel structure, automobile bumpers, auto body panels, polymer films, fabric coated sheets, polymer sheets, foams, coatings, computer parts, building materials, household appliances, electrical supply housings, trash cans, storage or packaging containers, lawn furniture, lawn mower and other garden appliance parts, acoustic systems, utility cart parts, toys and water craft parts. One skilled in the art can readily augment this list without undue experimentation. Additional articles include extrusion profiles and wall base profiles.

The parts that are produced by molding an inventive composition are excellent in moldability and mechanical strength, including excellent flexural modulus of elasticity and tensile break elongation, high rigidity, and high temperature and low temperature impact resistance.

The parts prepared from the inventive compositions have lightweightness, and impart a design freedom due to easiness of processing. Such compositions produce parts that have enhanced rigidity, fluidity and impact resistance, while having a reduction in molding shrinkage factor and dimensional change at the time of thermal treatment in a mold. Thus, such compositions make it possible to produce injection molded parts with a decreased wall thickness and improved thermal and mechanicals properties, and improved external appearance.

The inventive compositions are sufficiently fluid at molding temperatures to fill in a mold. Overall, the inventive compositions have excellent moldability and high rigidity, and can be used to form parts with an excellent mechanical strength, impact resistance, ductility, and thermal deformation resistance. Such parts have an excellent appearance, and have reduced dimensional changes, at the time of molding, and reduced coefficients of thermal linear expansion. The compositions are capable of producing injection molded parts having a wall thickness smaller than that of the parts prepared from conventional PC/ABS resins. In addition, such parts are lighter compared to parts prepared from a polycarbonate/ABS blend. Typically, parts prepared from the inventive compositions are on the order of seven weight percent lighter compared to a polycarbonate/ABS blend,

DEFINITIONS

Any numerical range recited herein, includes all values from the lower value and the upper value, in increments of one unit, provided that there is a separation of at least two units between any lower value and any higher value. As an example, if it is stated that a compositional, physical or other property, such as, for example, molecular weight, melt index, etc., is from 100 to 1,000, it is intended that all individual values, such as 100, 101, 102, etc., and sub ranges, such as 100 to 144, 155 to 170, 197 to 200, etc., are expressly enumerated in this specification. For ranges containing values which are less than one, or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this application. Numerical ranges are reported for, among others, density, weight percent of component, tan delta, molecular weights and other properties.

"Composition" and like terms means a mixture of materials which comprise the composition, as well as reaction products and decomposition products formed from the materials of the composition.

"Polymer" and like terms means a compound prepared by polymerizing monomers, whether of the same or a different type. The generic term polymer thus embraces the term homopolymer, usually employed to refer to polymers prepared from only one type of monomer, and the term interpolymer as defined below.

"Interpolymer," "copolymer" and like terms means a polymer prepared by the polymerization of at least two different types of monomers. The generic terms interpolymer and copolymer thus includes classical copolymers, i.e., polymers prepared from two different types of monomers, and polymers prepared from more than two different types of monomers.

"Ethylene/α-olefin interpolymer," "ethylene polymer," and like terms mean a polymer formed from predominantly (greater than 50 mole percent) ethylene monomeric units. Mole percentage is based on the total moles of polymerizable monomers.

"Blend", "polymer blend" and like terms mean a composition of two or more polymers. Such a blend may or may not be miscible. Such a blend may or may not be phase separated. Such a blend may or may not contain one or more domain configurations, as determined from transmission electron spectroscopy.

Measurements

"MI" and "$I_2$" mean melt index in g/10 mm measured using ASTM D-1238, Condition 190° C./2.16 kg for polyethylene-based polymers, and 230"C/2.16 kg for polypropylene-based polymers.

Density is measured in accordance with ASTM D-792. The density reported in the following examples is a "quick density", meaning that the density is determined after 1 hour from the time of molding.

Gel Permeation Chromatography

The average molecular weights and molecular weight distributions for ethylene-base polymers are determined with a gel permeation chromatographic system, consisting of a Polymer Laboratories Model 200 series high temperature chromatograph. The column and carousel compartments are operated at 140° C. for polyethylene-based polymers. The columns are three Polymer Laboratories 10-micron Mixed-B columns. The solvent is 1,2,4 trichlorobenzene. The samples are prepared at a concentration of 0.1 gram of polymer in 50 milliliters of solvent. The solvent, used as the mobile phase, and to prepare the samples, contains 200 parts per million (ppm) of butylated hydroxytoluene (BHT). Ethylene-base polymers are prepared by agitating lightly for 2 hours at 160° C., and propylene-base polymers are dissolved for 2.5 hours. The injection volume is 100 microliters, and the flow rate is 1.0 milliliters/minute (ml/min). Calibration of the GPC column set is performed with narrow molecular weight distribution polystyrene standards, purchased from Polymer Laboratories (UK), with weight average molecular weights ranging from 580 to 8,400,000. The polystyrene standard peak molecular weights are converted to polyethylene molecular weights using the following equation (as described in Williams and Ward, J. Polym. Sci., Polym. Let, 6, 621 (1968)):

$$M_{polyethylene} = A \times (M_{polystyrene})^B,$$

where M is the weight average molecular weight, A is 0.4315 and B is 1.0.

Polyethylene equivalent molecular weight calculations are performed using Viscotek TriSEC software Version 3.0. The molecular weights for polypropylene-based polymers can be determined using Mark-Houwink ratios according to ASTM D6474.9714-1, where, for polystyrene a=0.702 and log K=−3.9, and for polypropylene, a=0.725 and log K=1721. For polypropylene-based samples, the column and carousel compartments are operated at 160° C.

Differential Scanning Calorimetry

Differential Scanning Calorimetry (DSC) can be used to measure crystallinity in polyethylene (PE) based samples and polypropylene (PP) based samples. A sample is pressed into a thin film at a temperature of 190° C. About five to eight milligrams of film sample is weighed and placed in a DSC pan. The lid is crimped on the pan to ensure a closed atmosphere. The sample pan is placed in a DSC cell, and then heated, at a rate of approximately 10° C./min, to a temperature of around 180-200° C. for PE (230° C. for PP). The sample is kept at this temperature for three minutes. Then the sample is cooled at a rate of 10° C./min to −90° C. for PE (−90° C. for PP), and kept isothermally at that temperature for three to five minutes. The sample is next heated at a rate of 10° C./min until complete melting (second heat; around 180° C. for PE and 230° C. for PP). Unless otherwise stated, melting point(s) ($T_m$) of each polymer sample is determined from the second heat curve obtained from DSC, as described above. The crystallization temperature ($T_c$) is measured from the first cooling curve.

Test Plaque Preparation

Four-inch diameter disks with an average thickness of 3.2 mm are injection molded with a Toyo #3 injection molder. The disks weigh approximately 26 grams apiece. The mold is a single opening mold that molds a single disc per injection cycle. The tool is an insert that slides into a support frame.

ASTM D4101 provides basic guidelines for injection molding of polypropylene and polypropylene-based TPOs. The molding temperature is based on the MFR of the polymer measured at 230° C. and 2,16 kg. Material with a MFR of 4.1 is molded at 220° C. As the MFR increases, the recommended molding temperature decreases. A material with a MFR of 17.5 is molded at 200° C. To avoid complexity, the temperature zones in the injection molder are all set at 204° C. after the initial feed zone. The mold temperature is kept at 38° C. (100° F.).

The injection velocity is held constant at 25 millimeters per second (minis). This velocity is maintained from the start of the injection cycle until the transfer point (the point at which roughly 90 to 95% of the volume of the cavity is filled and the pressure registered at the gate begins to increase sharply). The pressure is then held for the hold or pack time. The pack pressure for this work is 5000 psi which is maintained for 25 seconds. The part is then allowed to cool for 25 seconds before de-molding.

The specifications and the operational profile of the injection molder are reported in Table 5.

TABLE 5

Specifications and Operational Profile of Toyo Injection Molder

| Molder Zone | Temperature (° C. (° F.)) |
|---|---|
| Feed | 48.9 (120) |
| Zone 2 | 204 (400) |
| Zone 3 | 204 (400) |
| Zone 4 | 204 (400) |
| Nozzle | 204 (400) |
| Mold | 38 (100) |

| Molding Parameter | Size or Quantity and Units |
|---|---|
| Shot Size | 52 cc |
| Screw Size | 40 mm |
| Transfer Point | 12 cc |
| Cushion | 5.1 cc |
| Hold Pressure | 34.5 MPa (5000 psi) |
| Injection Pressure | 172.4 MPa (25000 psi) |
| Fill Time | 1.6 s |
| Hold Time | 25 s |
| Cooling Time | 25 s |
| Total Cycle Time | 52 s |
| RPM | 50 |
| Back Pressure | 689 kPa (100 psi) |

The following examples illustrate, but do not, either explicitly or by implication, limit the present invention. Unless otherwise indicated, all parts and percentages are by weight.

EXPERIMENTAL

Five grades of polypropylene are described in Table 6 below.

Profax PD 702 is a conventional propylene homopolymer sold by Baseil.

JP 707 is a conventional, in-situ prepared, heterophasic impact propylene copolymer of propylene and ethylene sold by Mitsui Chemicals, Inc.

Accpro 9934X, now identified as Innovene H35Z-02, is a nucleated, 35 MFR, highly crystalline isotactic propylene homopolymer.

D118 is a developmental grade of nucleated highly crystalline propylene homopolymer available from The Dow Chemical Company. This polymer has a Mn of about 41,000 g/mole, an Mw of about 183,000 g/mole and a Mw/Mn of about 4.5.

CDC-1 is a version of D118 propylene homopolymer without the nucleator that is vis-broken with shear and peroxide to a melt index of 35.

CDC-2 is another version of D118 propylene homopolymer, but this version is prepared with a nucleating agent and then vis-broken to MFR of 35. This grade is now available as D221.

The flexural modulus was measured by ASTM D-790.

TABLE 6

Polypropylene Properties

|  | Supplier | Flexural Modulus (1% Secant, MPa) | Flexural Modulus (1% Secant, psi) | Heat Deflection Temperature, (0.455 MPa) (° C.) | MFR, 2.16 kg @ 230° C. (g/10 min) |
|---|---|---|---|---|---|
| PD 702 | Basell | 1255 | 181908 | 87.3 | 35 |
| JP 707 | Mitsui | 1207 | 175008 | 86.5 | 35 |
| H35Z-02 | Polymers and Olefins America | 2248 | 325939 | 135.9 | 35 |
| D118 | Dow Chemical | 2019 | 292797 | 130.6 | 8 |
| CDC-1 | Dow Chemical | 1665 | 241471 | 110.0 | 35 |
| CDC-2 | Dow Chemical | 2248 | 325939 | 135.9 | 35 |

As reported in Table 6, the flexural modulus and MDT are affected by both crystallinity of the isotactic homopolymer and the presence of a nucleator. The effect of nucleation can be clearly seen by examining the physical properties of the CDC grades, i.e., at least a thirty percent increase in the flexural modulus by nucleating the polymer.

Many EAO elastomeric impact modifiers are available for use in the practice of this invention, including ethylene/octene, ethylene/butene and ethylene/propene copolymers.

ENR 7380 is an ethylene 1-butene copolymer with a density of 0.87 Wee and a very low MFR of <0.3 at 190° C. and 2.16 kg. This polymer has a good balance of low Tg, low tan delta measured at 190° C. and 0.1 r/s, and a melting point Tin that is 10.3° C. less than its HDT which makes it good as an impact modifier for polypropylene. For applications requiring testing by instrumented dart impact at −30° C. and 6.7 m/s, excessive quantities of ENR 7380 or its talc dusted counterpart ENR 7387 are used to achieve this desired ductility.

ENR 7487 is a newly developed grade of ethylene 1-butene copolymer with a density of 0.86 g/cc and a very low MFR of <0.3 at 190 C and 2.16 kg. This grade has a Tg of −57° C., which makes it particularly well suited for impact modification at temperatures to −30° C., particularly instrumented dart impact testing at speed of 6.7 m/s. In side-by-side comparisons with ENR 7380, less ENR 7487 is required to achieve target impact resistance.

Contrary to what is taught in the literature, very low MI elastomers are the most efficient impact modifiers for highly talc-filled TPOs. Although these low MI elastomers are difficult to disperse in neat 35 MFR polypropylene, the particle size achieved in the presence of talc is very effective. This makes possible a combination of high modulus and ductility that is simply not achievable with the same formulation of highly crystalline polypropylene and talc but with more conventional ethylene alpha-olefin elastomers.

ENR 7380, and its talc-dusted equivalent, ENR 7387, have a very good balance of low Tg, low tan delta (190 C and 0.1 r/s) that allows low gloss, and an inherent resistance to creep that is reflected in its having a HDT greater than its peak melting temperature which in turn results in a higher HDT for the TPO. The sole deficiency for the material is a loss in impact modification efficiency at temperatures below 20° C., much less −30° C. when tested by instrumented dart impact at 6.7 m/s. Those skilled in the art will recognize that at lower test speeds, e.g., 3.2 m/s, the temperature at which efficiency is lost is lower. ENR 7487 solves this problem.

Table 7 and 8 below compare the impact modification efficiency of ENR 7487, ENR 7380, and the three most widely utilized ethylene 1-octene grades utilized for impact modification. These two studies are quite similar except the formulations in Table 7 contain lower elastomer content and are therefore more brittle. For the compositions of Table 7, the polypropylene:elastomer (PP:EAO) ratio is 2.33, and the PP:EAO/talc ratio is 1.1. The formulation with ENR 7487 is clearly the most efficient impact modifier, and it is able to achieve the targeted minimal total energy absorption of 22 ft-lb-f, but only at 3.2 m/s. When tested at 6.7 m/s all formulations fail the ductility test. All formulations, except for the one containing Engage™ 8180 as the elastomer, meet the peak tangent flexural modulus target of greater than 2100 MN (305 kpsi),

TABLE 7

Elastomer Comparison at Lower Elastomer Level
Comparison of Elastomers in Formulation with Lower Elastomer Level
(30 wt % of Polymer)

| Formulation, wt % | Elastomer Choice | | | | |
|---|---|---|---|---|---|
| 52.5% D221 | | | | | |
| 22.5% Elastomer | ENR 7487 | ENR 7387 | Engage 8180 | Engage 8150 | Engage 8842 |
| 25% JetFil 700C talc | | | | | |
| Tensile - Avg-Stress@ Yield psi | 1700 | 1786 | 1748 | 1788 | 1691 |
| Tensile - Ave-Strn@Break % | 31 | 20 | 37 | 25 | 50 |
| Avg-Flex Modulus, kpsi | 335 | 368 | 292 | 330 | 322 |
| Impact Tester −30° C., 3.2 m/s | | | | | |
| Total Energy, (ft-lb-f) | 22.6 | 12.1 | 2.8 | 2.6 | 4.6 |
| Max Load, (lb) | 808 | 619 | 356 | 270 | 515 |

TABLE 7-continued

Elastomer Comparison at Lower Elastomer Level
Comparison of Elastomers in Formulation with Lower Elastomer Level
(30 wt % of Polymer)

| Formulation, wt % | Elastomer Choice | | | | |
|---|---|---|---|---|---|
| Impact Tester −30° C., 6.7 m/s | | | | | |
| Total Energy, (ft-lb-f) | 16.4 | 15.14 | 9.86 | 12.13 | 9.10 |
| Max Load, (lb) | 748 | 726 | 649 | 664 | 628 |

For the compositions of Table 8, the PP:EAO ratio is 1.84 and the PP:EAO/talc ratio is 0.946. The elastomer content is higher relative to the compositions of Table 7 and as a consequence, the ductility of all systems has improved. Both ENR 7487 and ENR 7387 now meet the modulus requirement, but only ENR 7487 meets both the modulus and the total energy requirement.

TABLE 8

Elastomer Comparison at Higher Elastomer Level
Comparison of Elastomers in Formulation with Higher Elastomer Level
(35 wt % of Polymer)

| Formulation, wt % | Elastomer Choice | | | | |
|---|---|---|---|---|---|
| 48.75% D221 | | | | | |
| 26.25% Elastomer | ENR 7487 | ENR 7387 | Engage 8180 | Engage 8150 | Engage 8842 |
| 25% JetFil 700C talc | | | | | |
| Tensile - Avg-Stress@Yield psi | 1515 | 1612 | 1579 | 1610 | 1488 |
| Tensile - Avg-Strn@Break % | 42 | 37 | 60 | 30 | 47 |
| Avg-Flex Modulus, kpsi | 320 | 324 | 292 | 292 | 281 |
| Impact Tester −30° C., 3.2 m/s | | | | | |
| Total Energy, (ft-lb-f) | 31.0 | 20.0 | 12.5 | 2.5 | 10.1 |
| Max Load, (lb) | 807 | 840 | 628 | 293 | 388 |
| Impact Tester −30° C., 6.7 m/s | | | | | |
| Total Energy, (ft-lb-f) | 24.5 | 19.50 | 18.79 | 19.63 | 16.11 |
| Max Load, (lb) | 792 | 740 | 724 | 775 | 713 |

Table 9 shows another comparison of ENR 7380 and ENR 7487. The compositions of Table 9 have a PP:EAO ratio of 1.85 and a PP:EAO/talc ratio of 0.835. When tested at −30° C. and 6.7 m/s, ENR 7380 is simply not able to achieve the instrumented dart ductility requirement. These data points are part of an experiment to evaluate the effect of the specific energy of mixing. These samples are therefore compounded at a twin screw extruder RPM of 1000 though the conventional throughput of the extruder of 50 pounds per hour is kept the same,

TABLE 9

Comparison of ENR 7380 and ENR 7487 as Impact Modifiers

| | Sample No. | | | |
|---|---|---|---|---|
| | Sample 9-A | Sample 9-2A | Sample-1B | Sample 9-2B |
| ENR 7380 | 24.5% | | 24.5% | |
| ENR 7487 | | 24.5% | | 24.5% |
| D221 | 45.5% | 45.5% | 45.5% | 45.5% |
| JetFil 700C | 30% | 30% | 30% | 30% |
| RPM* | 1000 | 1000 | 1000 | 1000 |
| Output | 50 lb/hr | 50 lb/hr | 50 lb/hr | 50 lb/hr |
| Instrumented Dart. −30 C. at 6.7 m/s Max Load, (lb) | 714.5 | 783.1 | 745.8 | 817.6 |
| Total Energy, (ft-lb-f) | 18.1 | 26.0 | 19.8 | 28.7 |
| Treatment of pellets | Molded as is | Molded as is | Dried Before Molding | Dried Before Molding |

*Revolution per minute.

Table 10 shows the balance of the compounding conditions study which is done only with ENR 7487. The compositions of this table have a PP:EAO ratio of 1.86 and a PP:EAO/talc ratio of 0.835. Compounding at lower specific energy and using vacuum devolatization to remove moisture from the twin screw extruder during compounding allows for a high level of ductility despite a talc level of 30%.

TABLE 10

Instrumented Dart Impact Total Energy Adsorption at −30° C.

|  | Pellets Molded as Received | | | | | Pellets Dried Before Molding | | | | |
|---|---|---|---|---|---|---|---|---|---|---|
|  | Sample No. | | | | | | | | | |
|  | 10-1A | 10-2A | 10-3A | 10-4A | 10-5A | 10-1B | 10-2B | 10-3B | 10-4B | 10-5B |
| ENR 7487 | 24.5% | 24.5% | 24.5% | 24.5% | 24.5% | 24.5% | 24.5% | 24.5% | 24.5% | 24.5% |
| D221 | 45.5% | 45.5% | 45.5% | 45.5% | 45.5% | 45.5% | 45.5% | 45.5% | 45.5% | 45.5% |
| JetFil 700C | 30% | 30% | 30% | 30% | 30% | 30% | 30% | 30% | 30% | 30% |
| RPM* | 500 | 1000 | 500 | 1000 | 1000 | 500 | 1000 | 500 | 1000 | 1000 |
| Output | 50 lb/hr | 50 lb/hr | 50 lb/hr | 50 lb/hr | 50 lb/hr | 50 lb/hr | 50 lb/hr | 50 lb/hr | 50 lb/hr | 50 lb/hr |
| IDI** Total Energy (ft-lb-f) | 25.4 | 24.6 | 27.7 | 27.9 | 28.4 | 27.2 | 27.6 | 26.4 | 25.9 | 28 |

*Revolutions per minute
**Instrumented Dart Impact Total Energy (kpsi)

Metals and plastics are known to have a temperature at which their properties change dramatically from ductile to brittle. For polypropylene polymers, this ductile brittle transition temperature (D1317) increases as the crystallinity of the polymer increases. The DBTT also increases as the MFR of the polymer increases and as the filler level in the TPO formulation increases. The higher the DBTT, the more elastomer that must be added to the formulation to make it ductile at the desired test temperature. The final complexity is that the DBTT is also increased by faster impact test speed.

For injection molded parts, a highly crystalline homopolymer polypropylene with a MFR of 35 g/10 minutes tested at 230° C. and 2.16 kg is an attractive starting point. Talc can be utilized to lower the coefficient of thermal expansion and to increase the modulus and heat distortion temperature. For automotive interior applications, the best balance of flow, ductility at −30° C. and 6.7 m/s, and stiffness may limit the talc content to about 25 weight %.

For a thermoformed parts, such as the spoiler on the cab of heavy trucks, design requirements are very different. To match the extrusion and thermoforming process, the optimum starting point for the polypropylene might be a MFR of 2 g/10 min tested at 230° C. and 2.16 kg load. Talc not only increases the modulus and heat distortion temperature, but improves the thermoforming characteristics by making the formulation lower flow but with good shear thinning characteristics. The higher molecular weight of the polypropylene lowers the ductile brittle transition temperature allowing the use of either less elastomer, or more talc, or both. The ultimate properties that can be achieved are limited by the efficiency of the elastomer at meeting low temperature impact resistance targets with the least loss of modulus and heat distortion temperature.

Evaluating ductility in the range of DBTT is very difficult. Screening elastomers at an elastomer level that is just below the level required for full ductility is typically best. Less efficient impact modifiers become very brittle, and these are easier to distinguish from the most efficient modifiers in the pack.

As previously described, the formulation of the highly crystalline homopolymer polypropylene, high melt strength elastomers, and reinforcing fillers can be adjusted to meet the performance and processing requirements of an individual project.

For thick extruded and thermoformable sheets, lower MFR is required. This allows the use of higher molecular weight polypropylene which in turn lowers the ductile brittle transition temperature (DBTT). The lower DBTT allows either the use of more talc or lower elastomer, or both. This is reflected in Table 11 below. The compositions of this table have a PP:EAO ratio of 1.86 and a PP:EAO/talc ratio of 0.80. The In every case, the formulation is a compound of 56% highly crystalline homopolymer polypropylene, 14% ENR 7487, and 30% talc. The study examines the effects of the polypropylene choice (D221 with an MFR of 35 or D207.02 high crystalline homopolymer with an MFR of 2), the talc choice (JetFil 700C with a top particle size of 15 microns or JetFine 3CA with a top particle size of 7), or ratio of feed rate to mix rate (0.1 lb/hr/rpm or 0.2 lb/hr/rpm). Clearly the formulations with the higher molecular weight homopolymer polypropylene are the ones that meet not only the application requirements of low flow, but also the ductility plus modulus requirements.

TABLE 11

Effect of Composition Components and Feed Rate:Mix Rate Ratio On DBTT

|  | Sample No. | | | | | | | |
|---|---|---|---|---|---|---|---|---|
|  | 11-1 | 11-2 | 11-3 | 11-4 | 11-5 | 11-6 | 11-7 | 11-8 |
| Talc | JetFine 3CA | JetFine 3CA | JetFine 3CA | JetFine 3CA | JetFil 700C | JetFil 700C | JetFil 700C | JetFil 700C |
| PP | D221 | D221 | D207.02 | D207.02 | D221 | D221 | D207.02 | D207.02 |
| lb/hr/RPM | 0.2 | 0.1 | 0.2 | 0.1 | 0.2 | 0.1 | 0.2 | 0.1 |
| Flex Mod, MPa | 2645 | 2713 | 2502 | 2460 | 2676 | 2655 | 2424 | 2359 |
| MFR | 5.17 | 4.66 | 1.05 | 1.11 | 4.71 | 4.75 | 1.15 | 1.18 |
| Ave Total* | 5.4 | 8.1 | 23.8 | 29.8 | 14.0 | 18.2 | 30.1 | 30.9 |

*Average of Ten Runs, Measured at 6.7 m/s.

Although the invention has been described in certain detail through the preceding specific embodiments, this detail is for the primary purpose of illustration. Many variations and modifications can be made by one skilled in the art, without departing from the spirit and scope of the invention, as described in the following claims. All United States patents, patent application publications and allowed patent applications cited above are incorporated in their entirety herein by reference.

What is claimed is:

1. A filled, TPO composition having a total energy absorption during impact at −30° C. of at least 22 ft-lb-f, (29.83 N-m or J) as measured by an Instrumented Dart Impact Test ASTM D3763 at 6.7 meters/second and a peak tangent flexural modulus equal to or greater than (≧) 2100 MegaPascal (MPa) (305,000 pounds per square inch (psi)) as measured by ASTM D-790, the composition comprising based on the total weight of the TPO composition:
   A) 36-56 wt % of a crystalline polypropylene having a MFR of at least 1 and a melting point (Tm) of at least 160° C. as measured by differential scanning calorimetry (DSC); and
   B) 64-44 wt % of an EAO elastomer/filler composition comprising (1) an EAO elastomer having a (1) Tg of less than −50° C. as measured by DSC, (b) tan delta between greater than 2 and 3 as measured at 0.1 rad/s and 190° C. with an Advanced Rheometric Expansion Systems (ARES) rheometer, and (c) HDT greater than or equal to the peak melting temperature of the EAO elastomer as measured by DSC, and (2) a platy filler, the EAO elastomer and filler present at a weight ratio of EAO elastomer to filler of 3:2 to 2:1; the crystalline polypropylene and EAO elastomer present at a weight ratio of polypropylene to EAO elastomer of less than 2.

2. A filled, TPO composition having a total energy absorption during impact at −30° C. of at least 22 ft-lb-f, (29.83 N-m or J) as measured by an Instrumented Dart Impact Test ASTM D3763 at 6.7 meters/second and a peak tangent flexural modulus equal to or greater than (≧) 2100 MPa (305,000 psi) as measured by ASTM D-790, the composition comprising based on the total weight of the TPO composition:
   A) 36-56 wt % of a crystalline polypropylene having a MFR of at least 1 and a melting point (Tm) of at least 160° C. as measured by differential scanning calorimetry (DSC); and
   B) 64-44 wt % of an EAO elastomer/filler composition comprising (1) an EAO elastomer having a (1) Tg of less than −50° C. as measured by DSC, (b) tan delta between greater than 2 and 3 as measured at 0.1 rad/s and 190° C. with an Advanced Rheometric Expansion Systems (ARES) rheometer, and (c) HDT greater than or equal to the peak melting temperature of the EAO elastomer as measured by DSC, and (2) a platy filler, the EAO elastomer and filler present at a weight ratio of EAO elastomer to filler of 3:2 to 2:1.

3. The TPO composition of claim 2 in which the total energy absorption during impact at −30° C. is at least 25 ft-lb-f (33.9 N-m or J) and the flexural modulus is ≧2210 MPa.

4. The TPO composition of claim 2 comprising 39-53 wt % of the crystalline polypropylene and 61-47 wt % of the elastomer/filler composition.

5. The TPO composition of claim 2 in which the crystalline polypropylene has an MFR of at least 30.

6. The TPO composition of claim 2 in which the crystalline polypropylene is an isotactic propylene homopolymer having a crystallinity of at least 99% as measured by insolubility in xylene at 23° C. and an HDT greater than 100° C.

7. The TPO composition of claim 2 in which the crystalline polypropylene has a flex modulus greater than 2210 MPa and an HDT greater than 120° C.

8. The TPO composition of claim 2 in which the EAO elastomer has a Tg of less than −52° C. and a tan delta of greater than 2.1.

9. The TPO composition of claim 8 in which the alpha-olefin of the EAO elastomer comprises 3 to 20 carbon atoms.

10. The TPO composition of claim 9 in which the alpha-olefin is at least one of propylene, 1-butene, 1-hexene and 1-octene.

11. The TPO composition of claim 10 in which the EAO elastomer comprises a homogeneously branched or homogeneously branched substantially linear EAO interpolymer.

12. The TPO composition of claim 11 in which the EAO has a Tg lower than −54° C.

13. The TPO composition of claim 2 in which the platy filler is an inert mineral powder and has a medium particle size of 0.1 to 50 microns.

14. The TPO composition of claim 13 in which the platy filler is at least one of talc, Kaolin clay and mica.

15. The TPO composition of claim 14 in which the platy filler is talc.

16. The TPO composition of claim 15 having a ductility of 100%.

17. The TPO composition of claim 2 in which the crystalline polypropylene is branched through azide coupling.

18. The TPO composition of claim 2 in which the crystalline polypropylene is a propylene homopolymer.

19. A molded article comprising at least one component formed from the composition of claim 2.

20. The molded article of claim 19 in the form of a computer part, building or construction material, component part of a home appliance, container, furniture or a furniture component, footwear or footwear component, or toy.

* * * * *